Sept. 10, 1963
D. C. JENNINGS
3,103,427
CARBON DIOXIDE FREEZEOUT SYSTEM
Filed June 28, 1960
3 Sheets-Sheet 1
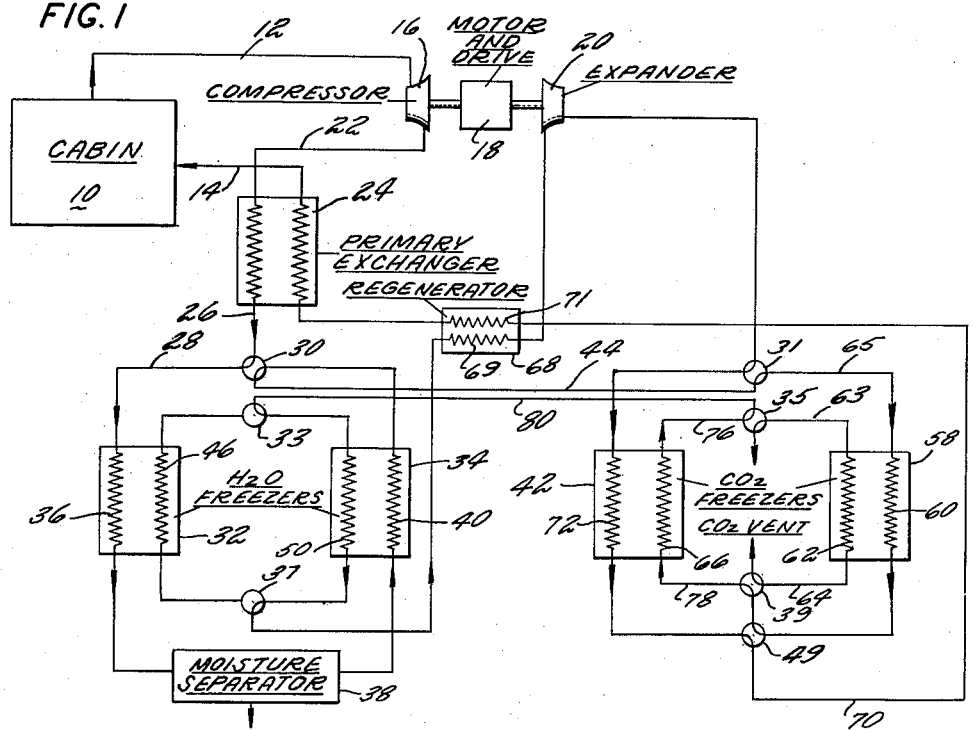
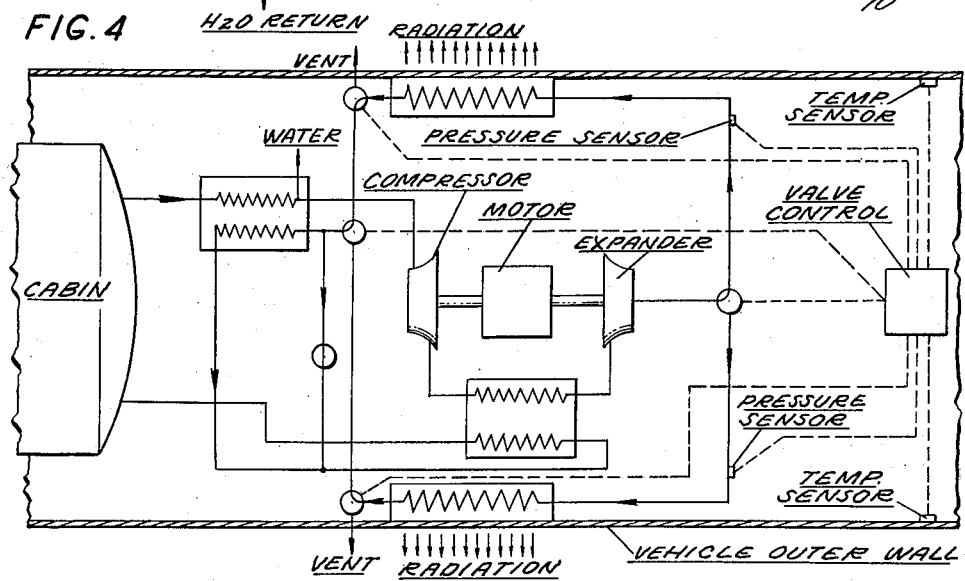
INVENTOR
DAVID C. JENNINGS
BY *Norman Friedland*
AGENT

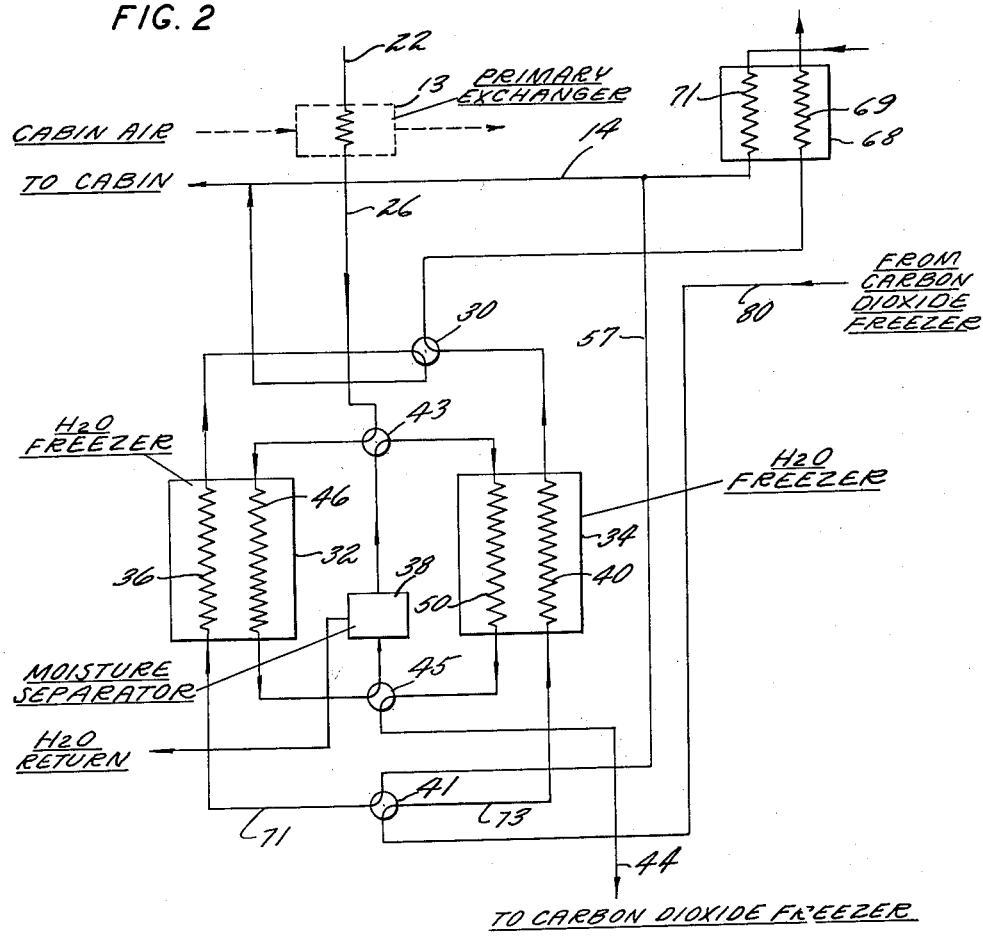

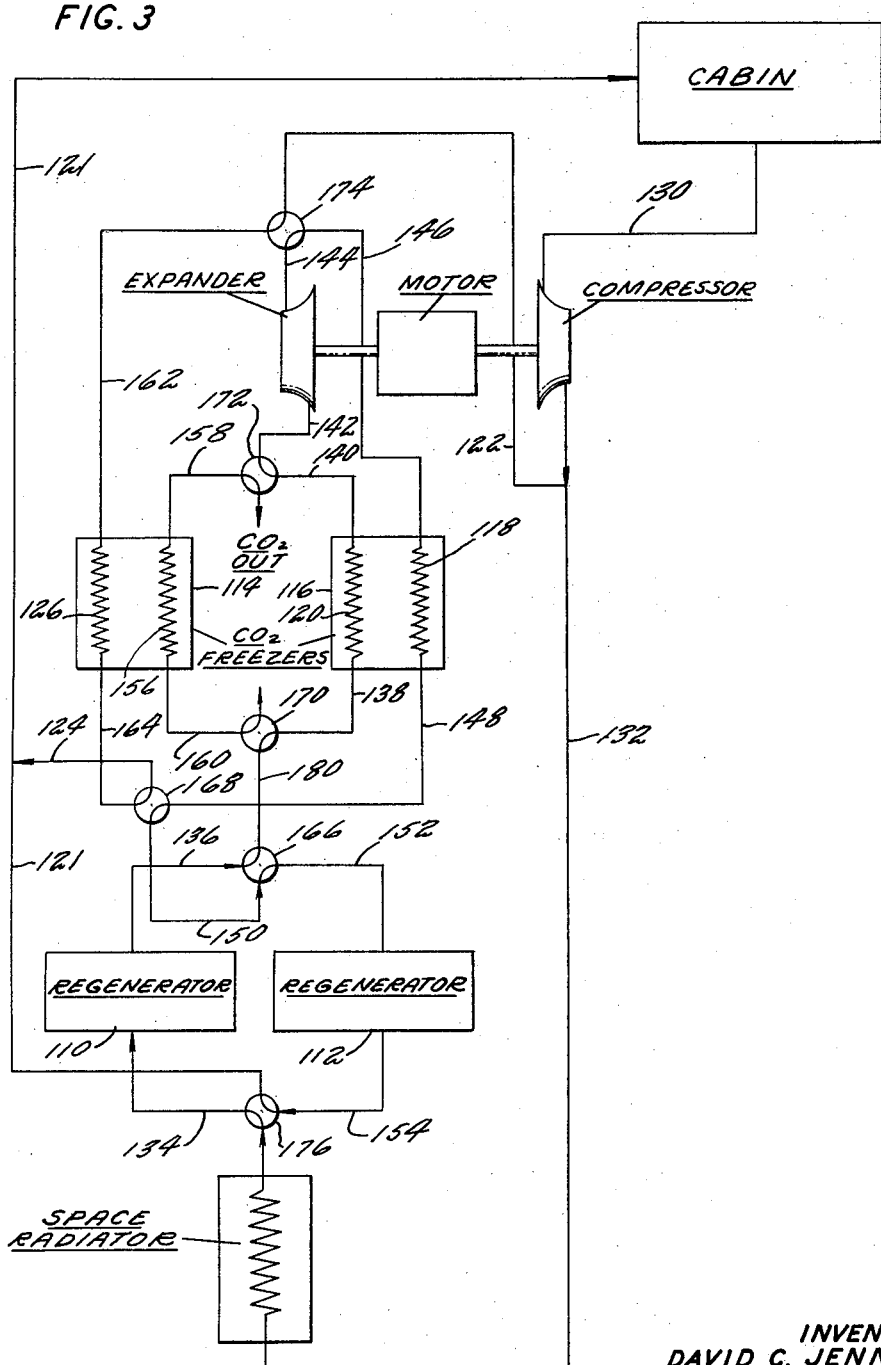

United States Patent Office 3,103,427
Patented Sept. 10, 1963

3,103,427
CARBON DIOXIDE FREEZEOUT SYSTEM
David C. Jennings, Windsor Locks, Conn., assignor to United Aircraft Corporation, East Hartford, Conn., a corporation of Delaware
Filed June 28, 1960, Ser. No. 39,367
4 Claims. (Cl. 62—39)

This invention relates to an environmental control system for a closed compartment which is occupied by one or more human beings, and more particularly to a system for extracting carbon dioxide from the artificial atmosphere of such a sealed cabin in order to limit the concentration of carbon dioxide to a level compatible with support of human life. It is fundamentally important in such a sealed compartment, as, for example, in an outer space vehicle, to provide means for reconditioning the air so as to preserve a habitable atmosphere with regard to physical state and chemical composition, and an essential requirement is found in the need to remove carbon dioxide at a rate substantially equivalent to the rate at which it is generated by the human occupants.

Industrial operations, particularly those concerned with the synthesis or purification of certain gas mixtures of gases, have employed various types of systems for removal of carbon dioxide, including methods of chemical adsorption, adsorption, liquefaction, and freezeout, but their concern has been primarily with removal of carbon dioxide within economic considerations pertinent to operations on or near the surface of the earth, where power required and equipment weight are not of the same degree of importance as in a space vehicle. Therefore, it is an object of this invention to provide a carbon dioxide freezeout system which lends itself particularly to the requirements of a space vehicle and is characterized by high thermodynamic efficiency, low power consumption, and inherently low system weight so as to avoid undue penalties to the overall performance of a manned space vehicle.

It is still a further object of this invention to remove carbon dioxide from the contained atmosphere by a system as described at a rate substantially equivalent to the rate at which it is being introduced into the closed compartment atmosphere by the exhalations of the human occupants, that is to say that the concentration of carbon dioxide will not for any significant period of time exceed a previously established maximum allowable concentration level. This may be accomplished either by continuous or intermittent operation of the system.

It is an important feature of this invention to utilize the heat which is extracted from the processed atmosphere in reducing its temperature to the range in which carbon dioxide will be frozen for reheating this processed atmosphere after carbon dioxide separation and prior to returning it to the closed compartment.

It is a still further object to provide a system in which the processed atmosphere is used as the refrigerant fluid for abstracting heat from the gas cooled and delivering it to the returning gas or other means for heat rejection at temperatures higher than the freezing temperature range of the carbon dioxide removed.

It still is a further object of this invention to provide a system that is unaffected by the gravitational problems normally associated with a zero gravity environment.

It still is a further object of this invention to provide a refrigeration system for removing carbon dioxide from an atmosphere wherein a pair of carbon dioxide freezers are alternately connected to a pair of heat regenerators and which freezers and regenerators are operable independently of each other.

It is still a further object of this invention to provide a refrigeration system utilizing a bootstrap refrigeration cycle and having a connection for alternately supplying compressor discharge air to the carbon dioxide freezers for accelerating sublimation and a second connection for utilizing a portion of the heat generated by the compressor for heating the carbon dioxide free air.

Upon reviewing the description which is made in conjunction with the following drawing, one skilled in the art will readily realize that various modifications may be made without departing from the spirit and scope of this invention.

FIG. 1 diagrammatically illustrates a preferred embodiment of this invention including a system for removing both water and carbon dioxide.

FIG. 2 is a partial showing of a schematic illustration of another embodiment of this invention.

FIG. 3 diagrammatically illustrates another preferred embodiment which utilizes a pair of regenerators automatically connected with a pair of carbon dioxide freezers.

FIG. 4 diagrammatically illustrates this invention and utilizes a plurality of space radiators which form or are incorporated in a portion of the wall of a space vehicle.

Referring more particularly to FIG. 1, a cabin generally indicated by numeral 10 is shown to have inlet conduit 14 and exit conduit 12 connecting a water and carbon dioxide freezeout system. The word cabin in this instance has been selected for the convenience of terminology and is to be understood that compartments, cabins, or the combination thereof is equally applicable. Air which has been contaminated by the exhalation of the occupants within the cabin is extracted by compressor 16 which is driven by the combination of motor 18 and expander 20 which may take the form of any of the well known positive or non positive displacement expansion motors. As will be appreciated from the following description, the compressor and expander are connected in bootstrap relationship, that is to say that the air which is being compressed is subsequently used to propel the expander in such a manner that energy is expended from the compressed air so as to be adiabatically expanded, which results in a substantial temperature drop. Of course, a portion of the power therefore is supplied by the expander while the remainder portion may be supplied by an electrical motor or any other suitable means. As the air leaves the compressor, it is precooled by primary heat exchanger 24 and directed therefrom to the water freezer by 4-way valve 30 which connects line 26 to line 28. It will be realized that while one set of freezers is utilized for removing water and carbon dioxide from the air stream, the second set is being regenerated and held in a stand-by condition until a predetermined time so as to allow either one of the freezer systems to complete its cycle. The method for automatically cyclically connecting the water freezers to the carbon dioxide freezers is well known in the art, while it should be realized that connecting the carbon dioxide discharged air to water freezers is an important feature to this invention as will be more fully appreciated from the description to follow.

Still referring to FIG. 1, the precooled compressed air is passed through passage 36 of heat exchanger 32 for melting the ice which has accumulated from the previous cycle and leaves therefrom at a temperature, say 35° F. The moisture is in turn fed to moisture separator 38 where the moisture is collected in any of the well-known types and in such a manner so as not to interfere with the air stream which is directed to passage 40 of heat exchanger 34 for further cooling of the air. The purpose of this operation is to assure that the air fed to the carbon dioxide freezeout system is substantially free of all of its moisture content. Owing to the fact that the air in passage 50 which has previously been in communication with the carbon dioxide freezers is at a low temperature; the temperature of the air in passage 40 which is in heat transfer relation thereto will be reduced to say, −150° F. The air, now essentially free of its moisture, is then fed to passage 60 of heat exchanger 58 which is in out-of-contact heat relation with the fluid in passage 62 which has accreted with frozen carbon dioxide from the previous cycle. The temperature of the air in passage 60 is decreasing, due to the transfer of heat to passage 62 which causes the rate of sublimation of the carbon dioxide to increase. The sublimed carbon dioxide is then vented out of the system to a low pressure or zero pressure environment via line 64 and 63. The now colder air is admitted to freezer 42 where a major fraction of the carbon dioxide in the processed air freezes and accretes within passage 66. The air which is now at a low temperature say, −240° F., is fed to passage 50 of freezer 34, taking up some of the heat released by freezing the water in passage 40 as previously mentioned and then fed through regenerator heat exchanger 68 for recooling the air and then to expansion motor 20 for further cooling of the air. The air is then delivered to freezer 42 where it is utilized for bringing down the temperature of the air contaminated with carbon dioxide in passage 66 for the purpose of condensing and separating carbon dioxide as previously mentioned. The air is then delivered to the cabin via passage 70 passing through regenerator 68 and primary heat exchanger 24 and picking up heat through each one of these devices.

From the foregoing, it is apparent that a large portion of the energy which has been expanded in lowering the temperature of the carbon dioxide and water contaminated air is regained by precooling the air stream at various locations in the cycle, prior to readmittance to the cabin. Although one shown, the water collected in the moisture separator 38 may be ejected into the cabin for rehumidification purposes or collected and used in liquid form. It is an important feature of this invention that the sublimated carbon dioxide is venting without incurring a loss of water, which in a space vehicle, is a valuable commodity.

Upon reaching a predetermined load in the freezers, the activated freezers may be automatically or cyclically connected in the following manner. Valves 30, 31, 33, 35, 37, 39 and 49 are caused to rotate for reversing the flow path. Although it is to be understood that the water freezeout system and carbon dioxide freezeout system may be cycled independently of each other, the air discharging from primary heat exchanger 24 is directed to passage 40 of freezer 34 and melting frozen water which had accumulated therein and passing the moisture laden water through the moisture separator 38 and then to passage 36 of heat exchanger 32 and delivering the air at a lower temperature through passage 72 of freezer 42. At this point the air rejects heat from the carbon dioxide laden passage 66 which now provides means for increasing the rate of sublimation therein so as to increase the process of venting the carbon dioxide via passages 76 and 78 to a low or zero pressure environment. The now cooler air discharging from freezer 42 is delivered to passage 62 of freezer 58 where heat is absorbed therefrom causing condensation of the carbon dioxide within the chamber of the freezer. The carbon dioxide free air is then delivered via passage 80 to passage 46 of heat exchanger 32 which supplies the low temperature sink for bringing the dew point temperature of the moisture laden air in passage 36 to say, −150° F. At this point the air discharging from passage 46 is slightly warmer and is again precooled at regenerator 68 and delivered to expander 20 for further lowering of its temperature prior to delivery to passage 60 of heat exchanger 58. From this point the air is then redelivered to the cabin via line 70, regenerator 68, heat exchanger 24, and line 14 absorbing heat in each one of these heat transfer devices. Reversing exchangers and their operation are well known in the art and may be operated either manually or automatically.

Another exemplified system is shown in FIG. 2 which is substantially similar to FIG. 1 which has been modified in its preferred form in such a manner as to more effectively utilize the heat transfer effectiveness of the water freezers. As will be noted as shown in FIG. 1 on alternate cycles, passages 46 and 50 of heat exchangers 34 and 36 respectively have been dead-ended. In order to utilize the heat transfer effectiveness of these heat exchangers, the flow path of the embodiment shown in FIG. 2 has been arranged so that the fluid is continuously flowing through these passages in such a manner as to be in heat transfer arrangement so as to precool the air prior to freezing the moisture content. As will be noted, another valve and associated connecting conduits have been included to divide the flow in line 14 for bleeding cool air via lines 53 and 71 and alternately through lines 53 and 73 so as to take advantage of the low heat content within the water freezers. It will also be noted that the manner of feeding the air stream to the water freezers has been modified by alternately connecting the heat exchanger discharge air in line 26 to passages 46 and 50 in freezers 32 and 34 respectively. It will further be noted that these passages are alternately connected to the moisture separator. Thus, during one cycle of operation a portion of the purified air discharging from regenerator 68 is diverted through line 57, valve 41, through passage 36 of water freezer 46 and returned to line 14 just prior to being injected into the cabin by way of valve 30. In alternating this flow path so as to take advantage of the cold temperature air for precooling the cabin discharge air valves 41, 45, 43, and 30 are caused to rotate. Thus, the portion of purified air discharging from regenerator 68 is conducted through line 57, valve 41, passage 40 of water freezer 34 and returned to line 14 via valve 30. This arrangement makes possible the use of a much smaller and consequently lighter weight heat exchanger generally indicated by numeral 13. This heat exchanger may be entirely eliminated but is shown in this particular embodiment because with its inclusion the component units such as the freezers and expanders may be utilized at lower efficiencies and also making the system operable over a wide range of temperature conditions.

In accordance with this invention, an example of the condition of the air as evidenced in each component is included hereinbelow for illustration purposes. The following will be evidenced when the compressor efficiency is 90%, the expander efficiency is 85%, regenerative heat exchanger effectiveness is 90%, and the freezer effectiveness is 90%. Referring to the embodiment shown in FIG. 2 in conjunction with the embodiment of FIG. 1 and assuming the following conditions to exist in the cabin.

$$T = 35.0$$
$$P = 5.0$$
$$W_1 = 1.282$$
$$W_2 = 2.16$$

where

T is the temperature in degrees Fahrenheit.
P is the absolute pressure in pounds per square inch.
$W_1$ is the weight percentage of carbon dioxide in contaminated air.
$W_2$ is weight percentage of water in the contaminated air.

The condition of system components are:
At the compressor discharge—
$$T = 222.0$$
$$P = 14.0$$

At primary heat exchanger discharge—
$$T = 218.50$$
$$P = 13.99$$

At the water freezer in discharge passage 46—
$T = 35.0$
$P = 13.79$
$W_2 = 1.705$ At the inlet of water freezer passage 50—
$T = 35.0$
$P = 13.78$
$W_2 = 0.455$ At the discharge of the same—
$T = -160.0$
$P = 13.58$
$W_2 =$ Essentially 0

At the discharge of passage 60 of freezer 58—
$T = -179.0$
$P = 13.68$

At the discharge of passage 66 of freezer 42—
$T = -206.0$
$P = 13.48$
$W_1 = 0.47$ At the discharge of passage 40 of freezer 34—
$T = 11.0$
$P = 13.38$ At the discharge of passage 69 of regenerator 68—
$T = -165.0$
$P = 13.37$ At discharge of expansion motor 20—
$T = -230.7$
$P = 5.31$ At the discharge of passage 72 of freezer 42—
$T = -183.9$
$P = 5.11$ At the discharge of passage 71 of regenerator 68—
$T = 8.0$
$P = 5.1$ At the discharge of passage 36 of freezer 32—
$T = 209.5$
$P = 5.07$ From the foregoing example, it will be apparent that the temperature differential across the heat transfer portion of all the freezers, heat exchangers, and regenerators, which are all in their preferred form of the counter flow type, is at a substantially low value so that the efficiency of the respective heat transfer devices will evidence a minimum of entropy rises. As a result, a substantial reduction of the power requirements is realized.

Referring to FIG. 3 which shows another exemplary embodiment of this invention which particularly includes a pair of regenerators 110 and 112 which are alternately connected to freezers 114 and 116 and cyclically freezing carbon dioxide and venting the sublimed carbon dioxide. To facilitate in the explanation of this embodiment, explanation of the major parts which have already been described in the above, have been omitted. It will be noted that a space radiator, which may be mounted so that one of its surfaces forms a part of the outer skin of a space vehicle or projecting outwards from the vehicle, is utilized for extracting a portion of the heat in order to reduce the temperature of the air prior to delivery to the regenerator. The regenerator serves to extract heat from the air passing therethrough and retaining this heat in a manner well known in the art and then delivering the lower temperature air to carbon dioxide freezer. In one cycle, for example, carbon dioxide in the air in the carbon dioxide freezer 116 is condensed and the solid carbon dioxide accretes on the wall of the freezer whereupon carbon dioxide free air is then delivered to the expander, where its temperature is reduced and passed through passage 118 which is in out-of-contact heat relation to passage 120 for absorbing the energy for condensing the carbon dioxide. The air is then alternately passed to the regenerator which has previously been heated and then returned to the cabin via passage 121. Simultaneously, the inactive freezer 114 is connected to the compressor discharge air via passage 122 where it mixes with the carbon dioxide free air in line 121 by way of line 124 which was in communication with passage 126 of freezer 114. At this point the warmer air serves to increase the rate of sublimation of carbon dioxide which has accreted in freezer 114. When the temperature and pressure of the freezer has reached a predetermined value, the operation is switched so that the carbon dioxide freezer which has collected frozen carbon dioxide is now sublimated and vented out to a low or zero pressure environment, and the freezer which has previously been vented is now connected so as to collect frozen carbon dioxide.

Thus viewing the system as is shown in FIG. 3, cabin air is induced from the cabin through the suction line 130 and delivered to the compressor where it is slightly pressurized. However, as was explained in the above, the compressor also serves to load the expander. Compressor discharge air is then delivered to the space radiator through line 132 and then to regenerator 110 via line 134. The regenerator is connected to carbon dioxide freezer 116 by lines 136 and 138 where the carbon dioxide, due to the extreme low temperature of the carbon dioxide freezer, is extracted. The substantially carbon dioxide free air is then delivered to the expander through lines 140 and 142 where it is further cooled and then delivered to passage 118 of freezer 116 through lines 114 and 146. It will be appreciated that the air in passage 118 which is in indirect heat exchange relation with passage 120 tends to cool the air in passage 120 while tending to warm the air in passage 118. The discharge air leaving passage 118 is then directed to the other regenerator for regaining heat through lines 148, 150, and 152 and from there the residual air which is now free from carbon dioxide is returned to the cabin through lines 154 and 121.

It will be appreciated that during this cycle of operation passage 120 of carbon dioxide freezer 116 was collecting carbon dioxide. Passage 156 of carbon dioxide freezer 114 which had accreted with carbon dioxide in a similar manner in the previous cycle is during this cycle venting. This is accomplished by connecting passage 156 of freezer 114 to a lower pressure which in a space application would be the atmosphere by way of lines 158 and 160. In accordance with the invention, to increase the rate of sublimation and hence the discharging of carbon dioxide, compressor discharge air which is the warmest air in the cycle, is passed through lines 122, 162, 164, and branch line 124 which discharges the compressor discharge air into the air returning to the cabin. The amount of air bled off from the compressor is proportioned to accomplish the desired rate of sublimation.

To accomplish regeneration of freezers and regenerators, the flow path is alternated by rotation of valves 166, 170, 172, 174 and 176 so that in this manner the flow path is as follows: Cabin discharge air in line 130 passes through the compressor and the space radiator through line 132 and valve 176 which now connects the space radiator to regenerator 112 which in turn is connected to passage 156 of freezer 114 through lines 152, 180, and 160. From there the carbon dioxide free air is delivered to the expander through lines 158 and 142 and returned to freezer 114 through line 162 where it is placed in indirect heat exchange relation with passage 156 by passing through passage 126. From freezer 114 the air is delivered to regenerator 110 through line 164, valve 168, line 154, and valve 166, and line 136, and then returned to the cabin through line 134, valve 176, and line 121. Thus while this cycle is accreting carbon dioxide in freezer 114, the carbon dioxide accreted in freezer 116 is now vented overboard through passage 140 and valve 172 and passage 138 and valve 170. Again to increase the rate of sublimation, the compressor discharge air is directed through line 122, valve 176, and line 146 to passage 118 or freezer 116. From there the now cooler air is returned to the cabin through line 148, valve 168, branch line 124, and line 121.

FIG. 4 is another system for removing carbon dioxide by a freezing process wherein the sublimed carbon dioxide is vented out of the system at a rate substantially equal to the rate at which it is being introduced to the cabin. The radiators, which may be mounted to the outer skin of the outer space vehicle, are ideally suited for this particular application as is illustrated by the principle stated in the Stefan-Boltzmann law wherein heat is radiated at the rate in accordance with the following expression:

$$Q = EAOT^4$$

where

E is an emissivity coefficient
A is surface effective area
T is absolute temperature
O is a fundamental numerical constant Hence, if a gas is passed through a radiator which can reject heat to space and is insulated from other sources of heat, the gas will be cooled. When the liquefaction (or sublimation) temperature of a chemical constituent of the gas is reached, that constituent will change its state upon further cooling and the frozen constituents will no longer be associated with the residual gas. This type of gas purification process is particularly appropriate to a space vehicle, since, except in the direction of the sun or a planet, the heat receiver is essentially all space to infinity, with a receiver equivalent temperature of zero absolute.

Thus, carbon dioxide and water may be condensed from vapor to solid states, whence they will be separated from the cabin atmosphere by passage through the radiator.

The precooler(s) and the compressor-heat exchanger-expander unit permit a reduction in the amount of heat which will need to be abstracted by radiation, hence realizing a reduction in the size of the radiator, as well as providing the possibility of separately recovering and disposing of the water and the carbon dioxide. The radiators may be connected in parallel relation to each other so as to be adapted for automatically actuating the one exposed to the lowest temperature.

Reference is hereby made to U.S. application Ser. No. 339,385, filed by Walter E. Arnoldi, on June 28, 1960, and U.S. application Ser. No. 39,366, filed by Gorken Melikian and George Peters, on June 28, 1960, and assigned to the same assignee, which applications are directed to the systems shown in FIGS. 1, 2 and 4.

What has been shown in this invention are systems which are capable of removing water and carbon dioxide at a rate substantially equal to the rate in which it is being ejected into the system by the exhalations of the human occupants occupying the cabin. Since the heat which has been extracted for condensing the carbon dioxide is again utilized for reheating the air in its return to the cabin, a lightweight system is evidenced and the power consumed by the operation whether to be for continuous or intermittent operation is held at a minimum, thereby assuring a minimum penalty from both a weight and power standpoint.

It will further be realized that most of the moisture entrained in the air is removed prior to delivery to the carbon dioxide freezers and in such a manner that the water will not be vented along with the carbon dioxide. Also, this permits the use of a smaller and consequently lighter weight heat transfer device. It should be understood that the invention is not limited to the particular embodiments shown and described herein, but that various changes and modifications may be made without departing from the spirit or scope of this novel concept as defined by the following claims.

I claim:

1. In a system for removing carbon dioxide mixed in air contained in a sealed cabin, including a compressor, a motor along with an expander for driving said compressor, means for freezing carbon dioxide including first and second heat exchangers, a pair of regenerators, a radiator mounted on the wall of said cabin, means defining a flow path from said cabin, to said compressor, to said space radiator, to one of said regenerators, to said first heat exchanger, to said expander, back to said first heat exchanger, to the other of said regenerators and back to said cabin, means for sublimating and venting the frozen carbon dioxide in said first heat exchanger, means for accelerating the sublimation of the carbon dioxide in said first heat exchanger, said last mentioned means comprising passage means and valving means disposed therein connecting the downstream side of the compressor to said first heat exchanger.

2. In a system for removing carbon dioxide mixed in air contained in a sealed cabin, including a compressor, a motor along with an expander for driving said compressor, means for freezing carbon dioxide including first and second heat exchangers having first and second passageways, a pair of regenerators, a radiator mounted on the wall of said cabin, means defining a flow path from said cabin, to said compressor, to said space radiator, to one of said regenerators to said first passageway of said first heat exchanger, to said expander, to said second passageway of said first heat exchanger, to the other of said regenerators and to said cabin, means for alternately connecting said first passageway of said second heat exchanger to said expander, means defining a passage for alternately connecting the downstream side of said compressor to said first or said second heat exchangers and means for simultaneously venting the first passageway of the first or second heat exchanger when it is disconnected from said expander.

3. A system for removing carbon dioxide from air contained in a sealed cabin subject to the exhalation of its occupants, said system comprising, in combination, inlet and outlet passage means connected to said sealed cabin, means including first and second carbon dioxide freezers each having first and second passageways connected to and located between said inlet and outlet passage means for separating the carbon dioxide from the air, first and second heat transfer devices also connected to and located between said inlet and outlet passage means and connected to said carbon dioxide freezers, means for alternately interconnecting said first and second heat transfer devices to said first and second carbon dioxide freezers, said first and second heat transfer devices each containing energy storing means, an expander alternately connected to the second passageway of said carbon dioxide freezers for reducing the temperature of said carbon dioxide freezers to a value for condensing the carbon dioxide, conducting means for passing the air discharged from said second passageway of said carbon dioxide freezers to said energy storing means to lower its temperature, a compressor being driven by said expander located in said outlet passage for extracting air from the cabin, said compressor serving to direct during an alternate cycle the air from said cabin, to said compressor, to said first heat transfer devices, to the first passageway of said first carbon dioxide freezer, to said expander, to said second passageway of said first carbon dioxide freezer to said second heat transfer device and back to said inlet passage means, air bleed means interconnecting the downstream side of said compressor alternately to said first and second carbon dioxide freezers for directing a portion of compressor discharged air thereto, and means for venting the carbon dioxide during said alternate cycle from the first passageway of said second carbon dioxide freezer to a substantially low pressure source.

4. An environmental control system for an outer space vehicle containing a sealed cabin having air subjected to receiving a varying amount of carbon dioxide, said system comprising a radiator, a first carbon dioxide freezer having first and second passageways, a first regenerator connected between said radiator and said first carbon dioxide freezer, a second regenerator connected between the cabin and said first carbon dioxide freezer, a second carbon dioxide freezer having first and second passageways mounted in parallel relationship to said first carbon dioxide freezer and adapted to be alternately connected to either the first regenerator or the second regenerator, an expander for cooling the air located between said first and second regenerators and said first and second carbon dioxide freezers and alternately connected to said first and second carbon dioxide freezers, means for defining a flow path for successively passing air from said cabin through said space radiator, through said first regenerator, alternately through the first passageway of said first and second carbon dioxide freezers and through said expander, alternately through said second passageway of said first and second carbon dioxide freezers, through said second regenerator and back to said cabin, fluid passage means alternately connecting the downstream side of the compressor, to said second passageway of said first and second carbon dioxide freezers, then to said cabin, and means for alternately venting to a substantially low pressure said first passageway of said first and second carbon dioxide freezers when either of said freezers is connected to said downstream side of the compressor.

References Cited in the file of this patent
UNITED STATES PATENTS

| | | |
|---|---|---|
| 1,914,337 | Belt | June 13, 1933 |
| 1,949,616 | Messer | Mar. 6, 1934 |
| 2,022,782 | Pollitzer | Dec. 3, 1935 |
| 2,039,889 | De Baufre | May 5, 1936 |
| 2,089,558 | Karwat | Aug. 10, 1937 |
| 2,097,434 | De Baufre | Nov. 2, 1937 |
| 2,116,191 | De Baufre | May 3, 1938 |
| 2,256,421 | Borchardt | Sept. 16, 1941 |
| 2,641,114 | Holthaus | June 9, 1953 |
| 2,861,432 | Haselden | Nov. 25, 1958 |

FOREIGN PATENTS

| | | |
|---|---|---|
| 511,567 | Germany | Oct. 31, 1930 |
| 625,815 | Canada | Aug. 15, 1961 |
| 644,139 | Germany | Apr. 24, 1937 |
| 908,021 | France | Apr. 6, 1945 |
| 1,201,884 | France | July 15, 1959 |